(12) United States Patent
Malhotra et al.

(10) Patent No.: US 9,743,312 B1
(45) Date of Patent: Aug. 22, 2017

(54) METHOD AND SYSTEM OF SELECTING A QUALITY OF SERVICE FOR A BEARER

(71) Applicant: Sprint Spectrum L.P., Overland Park, KS (US)

(72) Inventors: Rajil Malhotra, Olathe, KS (US); Saravana Velusamy, Olathe, KS (US); Mike Erich, Olathe, KS (US); Rajesh Nautiyal, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 349 days.

(21) Appl. No.: 14/572,772

(22) Filed: Dec. 17, 2014

(51) Int. Cl.
*H04W 28/02* (2009.01)
*H04W 28/12* (2009.01)

(52) U.S. Cl.
CPC ....... *H04W 28/0268* (2013.01); *H04W 28/12* (2013.01)

(58) Field of Classification Search
CPC ......... H04W 28/0268; H04W 28/0284; H04W 28/0289; H04W 28/0252–28/0263; H04W 76/041; H04W 76/043; H04W 76/02; H04W 76/022; H04W 28/12
USPC .......................................................... 370/235
See application file for complete search history.

(56) References Cited

U.S. PATENT DOCUMENTS

| 6,683,853 B1* | 1/2004 | Kannas | H04L 12/5695 370/230 |
| 2004/0106405 A1* | 6/2004 | Gabriel | H04L 12/5695 455/435.1 |
| 2010/0318670 A1* | 12/2010 | Al-Shalash | H04W 76/02 709/229 |
| 2011/0223918 A1* | 9/2011 | Dahlen | H04W 24/00 455/436 |
| 2013/0051332 A1* | 2/2013 | Sridhar | H04W 48/06 370/329 |
| 2013/0272197 A1* | 10/2013 | Avila Gonzalez | H04W 28/02 370/328 |
| 2013/0329559 A1* | 12/2013 | Cabrera | H04W 28/0289 370/235 |
| 2014/0024383 A1* | 1/2014 | Rahman | H04W 28/0268 455/445 |
| 2014/0086052 A1* | 3/2014 | Cai | H04L 47/748 370/235 |
| 2014/0219083 A1* | 8/2014 | Mandyam | H04W 76/005 370/230 |

(Continued)

FOREIGN PATENT DOCUMENTS

WO 2013123467 A1 8/2013

*Primary Examiner* — Mark Rinehart
*Assistant Examiner* — Kenneth P Hunt

(57) ABSTRACT

Disclosed is a method and system of selecting a quality of service (QoS) level for a bearer. According to the disclosure, a network controller may track a level of congestion of a base station and report that congestion information to a policy server. Thereafter, the policy server may receive a message indicating that a new bearer is needed for a communication session with a user equipment device (UE) being served by the base station. In response, the policy server may select a QoS level for the new bearer based at least in part on the based station's level of congestion (and also perhaps based on a type of the communication session), and the policy server may then invoke use of the selected QoS level for the new bearer.

20 Claims, 5 Drawing Sheets

(56) References Cited

U.S. PATENT DOCUMENTS

2014/0347996 A1* 11/2014 Rahman ............ H04W 28/0268
370/235
2015/0098325 A1* 4/2015 Lu ...................... H04L 12/1407
370/230
2016/0226922 A1* 8/2016 Russell ............... H04L 65/1016

* cited by examiner

METHOD AND SYSTEM OF SELECTING A QUALITY OF SERVICE FOR A BEARER

BACKGROUND

Unless otherwise indicated herein, the description provided in this section is not prior art to the claims and is not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks. With this arrangement, a UE within coverage of the network may engage in air interface communication with a base station and may thereby communicate via the base station with various remote network entities or with other UEs.

For instance, in a network operating according to a Long Term Evolution (LTE) protocol, base stations may be coupled to network infrastructure that provides connectivity with one or more packet-data networks, such as the Internet, as well as one or more service platforms, such as an Internet Multimedia Subsystem (IMS) platform that provides access to particular types of packet-based services (e.g., voice over Internet Protocol (VoIP), streaming video, interactive gaming, etc.). This network infrastructure may include a controller such as a mobility management entity (MME), a gateway system such as a serving gateway (SGW) coupled to one or more packet-data network gateways (PGWs), a subscriber profile database such as a home subscriber system (HSS), and a policy server such as a policy charging and rules function (PCRF), among other entities. It should be understood that a cellular wireless network's infrastructure may also provide connectivity to various other transport networks and/or take various other forms as well.

When a UE first enters into the coverage of a cellular wireless network, the UE may engage in a process of registering or "attaching" with the network, which may trigger setup of various communication channels for the UE and/or reservation of various communication resources for the UE. For instance, upon first detecting coverage of a base station, the UE may transmit an attach request message to the base station, which the base station may forward to a network controller such as an MME. Upon authenticating and authorizing the UE, the network controller may then engage in further signaling with the base station and with an SGW, which may in turn engage in signaling with a PGW, ultimately resulting in setup of one or more bearer connections or "bearers" each extending, via the base station, between the UE and the PGW, through which the UE can then engage in packet-data communication via the PGW.

Each bearer established for a UE may define a logical communication tunnel that includes a radio bearer portion extending between the UE and the base station, and an access bearer portion extending between the base station and the PGW via the SGW. Further, each bearer may have a designated quality-of-service (QoS) level, which may dictate how the packet data transmission along the bearer is handled by the network. For instance, a bearer could have a relatively high QoS level, according to which network nodes (such as the base station, SGW, and various routers) along the bearer path could be set to prioritize routing of data on the bearer over routing of data on other bearers, perhaps to guarantee a particular minimum bit rate, a particular maximum level of packet delay, and/or a particular maximum level of packet loss. Alternatively, a bearer could have a relatively low QoS level, such as a "best efforts" QoS level, according to which nodes along the bearer path would simply do their best to route data of the bearer, subject to higher priority handling of other bearer traffic.

In practice, a network such as this may initially establish for a UE one or more default bearers to enable the UE to engage in certain basic communications, with each default bearer having a respective QoS level. By way of example, the network may initially establish for the UE a default Internet bearer with a best-efforts QoS level, for use by the UE to engage in general Internet communications such as web browsing, e-mail messaging, and the like. Further, if the UE subscribes to any IMS-based services such as VoIP call service, the network may initially establish for the UE a default IMS signaling bearer with a medium QoS level, for use by the UE to engage in session setup signaling (such as Session Initiation Protocol (SIP) signaling) with the IMS platform to facilitate setup of such IMS-based services.

As the UE is served by the network, the network may then establish additional bearers for the UE as needed. For example, if the UE has an IMS signaling bearer, the UE may engage in signaling over that bearer with an IMS platform to request setup of an IMS-based communication session, which typically requires a new dedicated bearer between the UE and the IMS platform. In response to this signaling, the network may then attempt to establish a new dedicated IMS bearer with a QoS level that corresponds to the type of IMS-based session being requested, such as a bearer having a high QoS level for a VoIP call. This may involve signaling from the IMS platform to the PCRF, from the PCRF to the PGW, from the PGW to the SGW, from the SGW to the MME, from the MME to the base station, and from the base station to the UE. Once the dedicated IMS bearer is established, the UE may then send and receive media content of the session over that dedicated IMS bearer.

OVERVIEW

In a cellular wireless network such as the one described above, there may be times when a base station is not capable of establishing a new bearer for a UE due to congestion or the like. For instance, a base station may have a limit on the number of radio bearers that it is capable of serving at any given time (either in total or per QoS level), and the base station may thus become incapable of establishing new bearers once it becomes congested and the limit is reached. This gives rise to a scenario where the network may carry out all the signaling required to establish the access portion of a new bearer between the base station and the PGW, but then the base station ends up rejecting the attempt to establish the new bearer due to congestion or the like, thereby causing the setup of the requested communication to fail. As can be seen, this results in unnecessary signaling in the network as well as undesirable delays in the call setup process.

Disclosed herein are methods and systems to help address this issue. In accordance with the disclosure, a network controller may be configured to track a level of congestion of one or more base stations in the network and periodically report this congestion information to a policy server. When a communication session is being set up with a UE being served by a given base station (e.g., a VoIP call), the policy server may then receive a message indicating that a new bearer is needed for that communication session. According to the present disclosure, this message may include an identifier of the given base station and an indication of the type of communication session being set up.

In response to receiving this message, the policy server may then select a QoS level for the new bearer based at least in part on the level of congestion of the given base station. For instance, according to one implementation, the policy server may first identify a QoS level that corresponds to the type of communication session being set up. In turn, the policy server may determine, based on the congestion information for the given base station, whether that base station is capable of establishing a new bearer having the identified QoS level. If so, the policy server may select the identified QoS level; otherwise, the policy server may select a different QoS level that the given base station is capable of supporting. The act of selecting the QoS level based on the level of congestion of the given base station may take other forms as well.

After selecting the QoS level, the policy server may then invoke use of the selected QoS level for the new bearer. For example, the policy server may send a directive that causes other entities in the network (e.g., a PGW, SGW, MME, and base station) to establish a new bearer having the selected QoS level.

Thus, the present disclosure may enable a network to make an earlier determination of whether a base station is capable of establishing a new bearer having a given QoS level and to then select the QoS level for the new bearer in accordance with this determination, which may improve the session setup process.

Accordingly, in one respect, disclosed is a method that involves a policy server (a) receiving a report indicating a level of congestion of a given base station, (b) thereafter receiving a message indicating that a new bearer is needed for a communication session being set up with a UE being served by the given base station (e.g., an IMS-based communication session such as a VoIP call), (c) based at least in part on the level of congestion of the given base station, selecting a QoS level for the new bearer, and (d) invoking use of the selected QoS level for the new bearer.

In practice, the level of congestion of the given base station may take various forms. In one example, the level of congestion may comprise a level of congestion of the given base station for each of a plurality of different QoS levels, which may be represented in terms of an extent of the given base station' established bearers having each of the plurality of different QoS levels. Many other examples are possible as well.

Further, the message indicating that the new bearer is needed for the communication session may take various forms. In one implementation, this message may include at least an identifier of the given base station. Additionally, the message may also include an indication of the type of communication session being set up. The message may take other forms as well.

Further yet, the act of selecting the QoS level for the new bearer based at least in part on the level of congestion of the given base station may also take various forms. In one implementation, the act of selecting the QoS level may involve (1) determining, based on the given base station's level of congestion, whether the given base station is capable of establishing a new bearer having a given QoS level (e.g., by determining whether the given base station has established a threshold extent of bearers having the given QoS level), and then (2) based on the determining, selecting either (i) the given QoS level (if the given base station is capable of establishing a new bearer having the given QoS level) or (ii) a different QoS level (if the given base station is not capable of establishing a new bearer having the given QoS level). In this implementation, the given QoS and the different QoS may then take various forms. As one example, the given QoS level may be a QoS level that corresponds to a type of communication session being set up and the different QoS level may be a next-highest QoS level that the given base station is capable of using to establish the new bearer. Other examples are possible as well.

In another implementation, the act of selecting the QoS level may involve selecting a highest QoS level that the given base station is currently capable of using to establish the new bearer. And the act of selecting the QoS level based at least in part on the level of congestion of the given base station may take other forms as well.

In another respect, disclosed is a method that involves a network controller (a) tracking a level of congestion of a given base station, (b) reporting the level of congestion of the given base station to a policy server, (c) routing signaling for setting up a communication session with a UE being served by the given base station, (d) thereafter receiving a directive to establish, for the communication session, a new bearer having a QoS level selected based at least in part on the level of congestion of the given base station, and (e) in response to the directive, engaging in signaling with the given base station to establish the new bearer.

In yet another respect, disclosed is a policy server that includes (a) a network interface configured to facilitate communication with one or more entities of a network, and (b) a controller configured to carry out the policy-server functions disclosed herein.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present disclosure will be described herein primarily in the context of LTE. However, it will be understood that principles of the disclosure can extend to apply in other scenarios as well, such as with respect to other air-interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
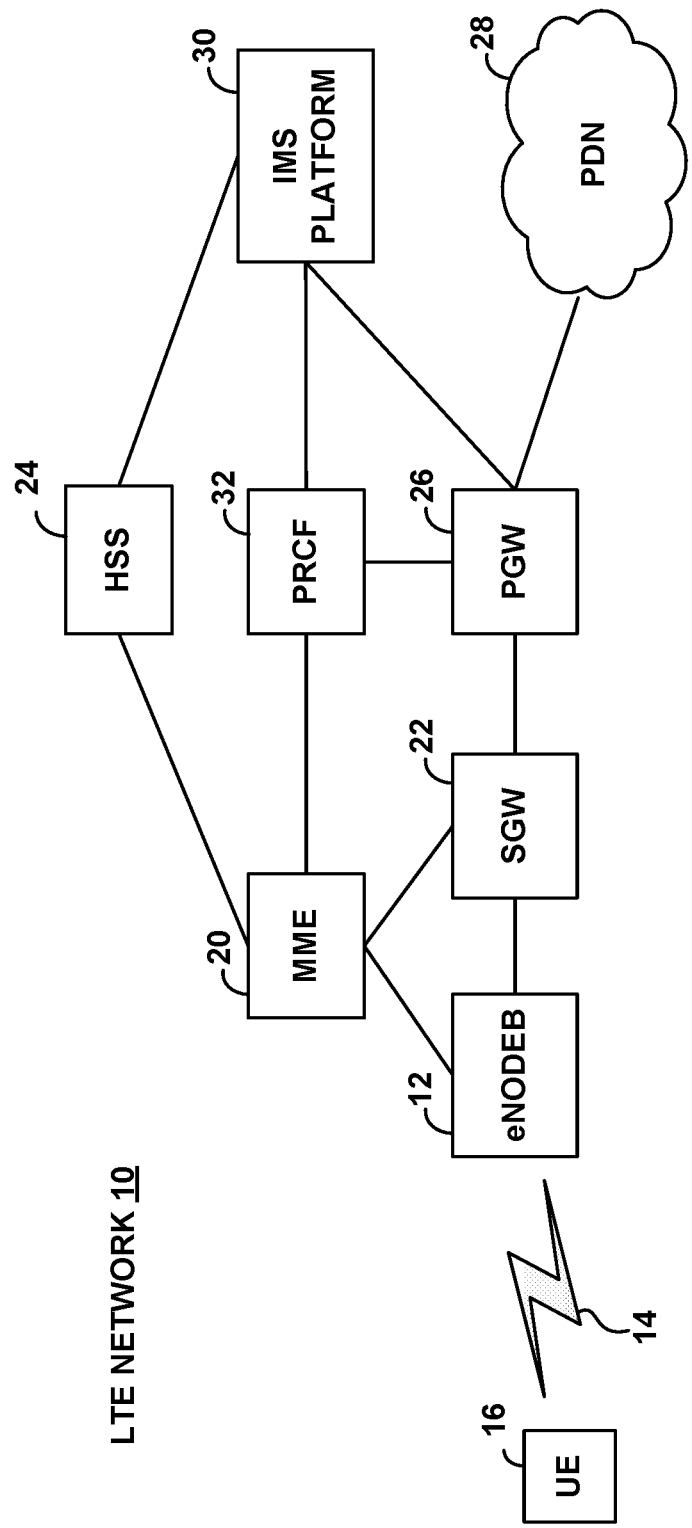
FIG. 1 is a simplified block diagram of a network arrangement in which features of the present disclosure can be implemented.

Referring to the drawings, as noted above, FIG. 1 is a simplified block diagram of a wireless communication system in which features of the present disclosure can be implemented. In particular, FIG. 1 depicts a representative LTE network 10, which functions primarily to serve UEs with wireless packet data communication service, including possibly voice over Internet Protocol (VoIP) service, but may also provide other functions.

As shown, the LTE network includes at least one LTE base station 12, known as an eNodeB, which has an antenna structure and associated equipment for providing a coverage area 14 in which to serve UEs such as example UE 16. (It should be also understood that the LTE network may include multiple eNodeBs). The eNodeB may have a communication interface with a MME 20 and with SGW 22. MME 20 may generally function as a controller for the LTE network, and may have a communication interface both with SGW 22 and with a subscriber database system 24 that stores subscriber profiles for UEs registered with the LTE network. As shown in FIG. 1, this subscriber database system 24 may take the form of a HSS, although other configurations are possible as well.

SGW 22 may in turn have a communication interface with a PGW 26 that provides connectivity to external packet-data networks and/or service platforms. For instance, PGW 26 is shown as providing connectivity both with a representative packet-data network 28 (e.g., the Internet) and also with an IMS platform 30 that provides access to particular types of packet-based services, such as VoIP call service, streaming video, interactive gaming, etc. Although not shown, IMS platform 30 may be comprised of a network of nodes, such as a call session control function (CSCF) and one or more application servers for instance, which may work together to manage the provision of the IMS-based services.

The LTE network 10 may then additionally include (and/or have access to) a policy server 32, such as a PCRF, which may generally function to maintain policy rules and/or make policy decisions for UEs being served by the LTE network. As shown in FIG. 1, PCRF 32 may be communicatively coupled with PGW 26 (e.g., via a Gx interface), IMS platform 30 (e.g., via an Rx interface), and MME 20 (e.g., via an Af interface).

In practice, the illustrated components of the LTE network may sit as nodes on a private packet-switched network owned by an operator of the LTE network, and thus the various communication interfaces may be logical interfaces through that network.

With this arrangement, when a UE such as UE 16 first powers on or otherwise enters into coverage of LTE network 10, the UE may engage in a process of registering or "attaching" with the LTE network, which may trigger setup of various communication channels for UE 16 and/or reservation of various communication resources for UE 16. For instance, upon entering into the coverage area of eNodeB 12, UE 16 may send an attach request to eNodeB 12, which may then forward the attach request to MME 20. MME 20 may then engage in signaling with HSS 24 to authorize and authenticate UE 16 and to obtain service profile data for UE 16, which the MME may store as a local context record for the UE.

Additionally, MME 20 may engage in signaling with eNodeB 12 and with SGW 22, which may in turn engage in signaling with PGW 26, to set up one or more bearers that define logical communication tunnels for carrying data traffic between UE 16 and PGW 26 through LTE network 10. For example, LTE network 10 may initially establish a default bearer for carrying general Internet traffic (e.g., web browsing, e-mail messaging, or the like) between UE 16 and packet-data network 28. As another example, if UE 16 subscribes to an IMS-based service such as VoIP, LTE network 10 may initially establish an IMS signaling bearer for carrying control signaling (e.g., SIP signaling) between UE 16 and IMS platform 30 to facilitate setup of IMS-based communication sessions.

As noted above, each of these bearers may have a designated QoS level. In one implementation, this QoS level may be represented as a QoS class indicator (QCI), which defines various QoS parameters (e.g., priority, delay, loss rate, etc.) for how the entities of the LTE network are to handle the packet-data transmission on the bearer. QCI values typically range from 1 to 9, with a QCI of 1 representing the highest QoS level and a QCI of 9 representing the lowest QoS level (sometimes referred to as "best efforts"). Using these QCI values as a point of reference, the LTE network may normally select a QCI of 9 for the default Internet bearer and a QCI of 5 for the IMS signaling bearer (but other QCI values could be used as well).

As discussed above, while serving UE 16, the LTE network may also establish other bearers for the UE. For example, UE 16 may at some point use the IMS signaling bearer to request a new IMS-based communication session such as a VoIP call, which may then trigger the LTE network to establish a new dedicated bearer for the requested communication session. This process may take various forms.

In one implementation, UE 16 may request a new IMS-based session by transmitting a SIP INVITE message to IMS platform 30 over the IMS signaling bearer. In practice, this SIP INVITE message may include Session Description Protocol (SDP) fields that carry information about the type of session being requested, such as the type of media to be exchanged (e.g., voice, audio, video, etc.), the transport protocol to be used (e.g., Real-time Transport Protocol (RTP) over User Datagram Protocol (UDP)), and/or the coding format of the session media (e.g., G.723.1 voice, H.261 video, etc.) for instance. The SIP INVITE message may include various other information as well. After receiving the SIP INVITE, IMS platform 30 may also engage in additional SIP signaling with UE 16 and/or with the called party. (It should also be understood that, instead of receiving the SIP INVITE from UE 16, IMS platform 30 may receive a SIP INVITE from a remote party that is attempting to call UE 16).

IMS platform 30 may then signal to PCRF 32 (e.g., via an Rx interface) to indicate that a new bearer is needed for the requested communication session with UE 16. For example, IMS platform 30 may send to PCRF 32 a Diameter message that includes information about the type of communication session being requested. Upon receiving this signal, PCRF 32 may then select a QoS level (e.g., a QCI value) that corresponds to the type of communication session being requested. For example, if the requested communication session is a VoIP call, PCRF 32 may normally select the highest QoS level (e.g., a QCI of 1), whereas if the requested communication session is some other type of IMS-based communication session, PCRF 32 may select another QoS level (e.g., a QCI of 2 or higher).

After selecting the QoS level for the new bearer, PCRF 32 may then engage in signaling to invoke use of the selected QoS level for the new bearer. For example, PCRF 32 may send a Diameter message that directs PGW 26 to establish a new bearer for UE 16 having the selected QoS level. In turn, PGW 26 may signal to SGW 22, SGW 22 may signal to MME 20, and MME 20 may signal eNodeB 12, to establish the new bearer having the selected QoS level.

However, in line with the discussion above, there may be times when eNodeB 12 will not be capable of establishing this new bearer. For instance, eNodeB 12 may have limits on the number of established radio bearers that the eNodeB can maintain at any given time, such as a limit on a total number of established radio bearers and/or a limit on a number of established radio bearers for each respective QoS level. If the eNodeB's congestion has risen to a level where one of these limits has been reached, eNodeB 12 may be incapable of establishing the new bearer and may thus need to reject the request to establish the new bearer. This gives rise to an undesirable scenario where the LTE network engages in all of the signaling described above and then the setup of the communication session still ultimately fails due to congestion at eNodeB 12. Disclosed herein are methods and systems to help address this issue.

Figure 2:
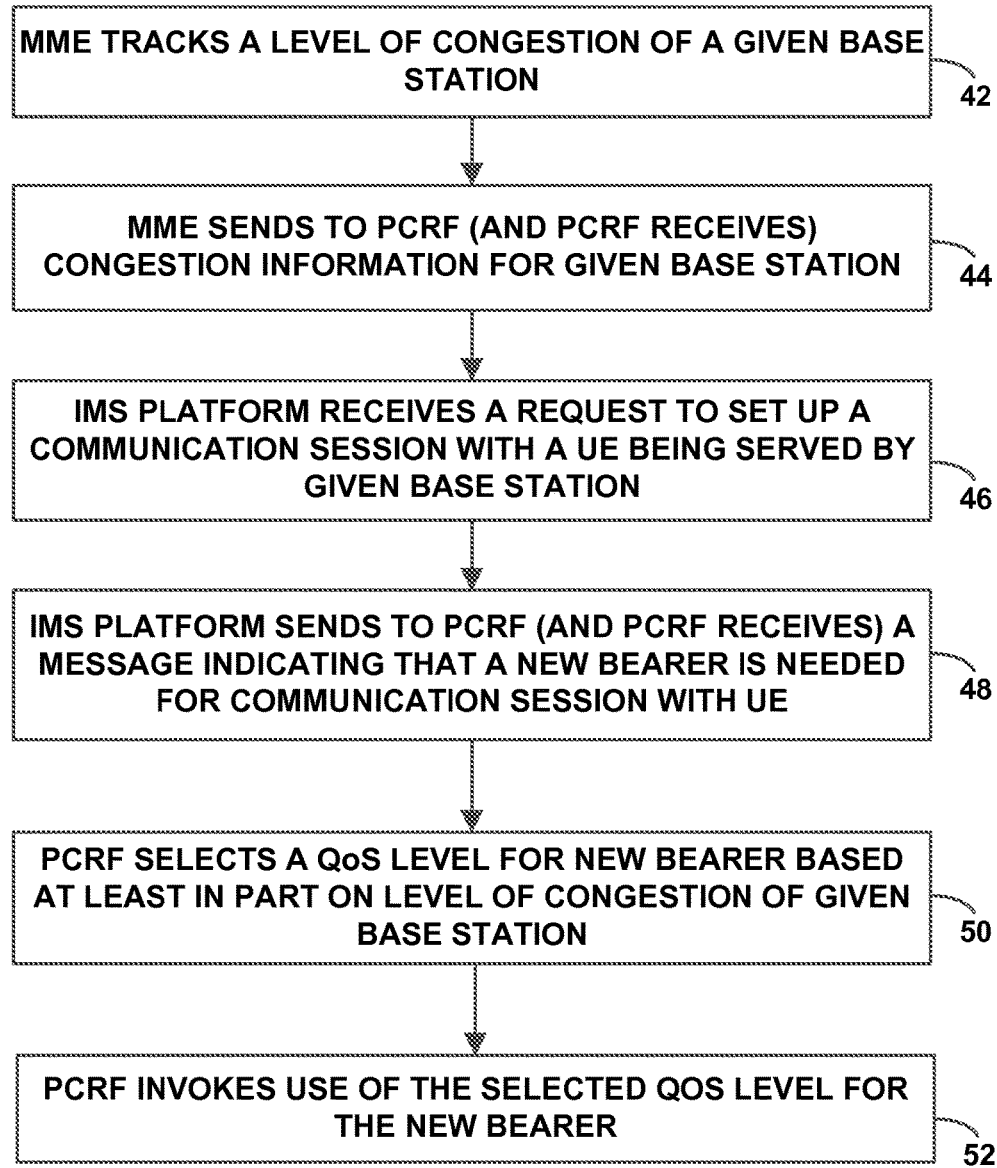
FIG. 2 is a flow chart depicting functions that can be carried out in accordance with the present disclosure.

FIG. 2 is a flow chart depicting functions that can be carried out in accordance with the present disclosure. For purposes of illustration only, these functions are described with reference to the LTE network depicted in FIG. 1. It should be understood, however, that these functions may be implemented in various other wireless communication systems as well.

As shown in FIG. 2, at block 42, a representative method may begin with MME 20 tracking a level of congestion of eNodeB 12. MME 20 may be configured to carry out this tracking in various manners.

In a preferred implementation, MME 20 may track the eNodeB's level of congestion for each of various different QoS levels (e.g., different QCI values or ranges of QCI values). For example, MME 20 may be configured to track a number of bearers of each such QoS level that are currently established with eNodeB 12, a percentage of available bearers of each such QoS level that are currently established with eNodeB 12, or the like. MME 20 may track the eNodeB's level of congestion for different QoS levels using other metrics as well.

In other implementations, MME 20 may track the eNode's level of congestion on a basis other than QoS level (e.g., a total level of congestion). Additionally, it should be understood that MME 20 could be configured to track the level of congestion of other eNodeBs in the LTE network in a similar matter.

At block 44, while tracking the level of congestion of eNodeB 12, MME 20 may send to PCRF 32, and PCRF 32 may receive, congestion information for eNodeB 12. For example, MME 20 may report the congestion information for eNodeB 12 to PCRF 32 by sending a message via an Af interface between MME 20 and PCRF 32. As another example, MME 20 may report the congestion information for eNodeB 12 to PCRF 32 by sending a message over a path that includes SGW 22 and PGW 26. MME 20 could report the congestion information for eNodeB 12 to PCRF 32 in other manners as well. MME 20 may also carry out this reporting at various times. As examples, MME 20 may be configured to report the congestion information for eNodeB 12 periodically according to a timer and/or in response to certain triggering events (e.g., as MME 20 detects changes in the bearers established with eNodeB 12).

The reported congestion information for eNodeB 12 may take various forms. As one example, the congestion information may include the same metrics that MME 20 uses to track the eNodeB's level of congestion for each of the various different QoS levels, such as a number of bearers, a percentage of available bearers, or the like. As another example, the congestion information may include an indicator (e.g., flag) for each of various different QoS levels that specifies whether or not eNodeB 12 is currently capable of establishing a new bearer having that QoS level. The congestion information may take other forms as well. Further, the congestion information for eNodeB 12 will preferably include and/or be keyed to an identifier of eNodeB 12 (e.g., a cell and/or sector identifier).

After receiving the congestion information for eNodeB 12, PCRF 32 may then store this congestion information, which may involve updating and/or overwriting congestion information for eNodeB 12 that PCRF 32 previously received from MME 20. Preferably, PCRF 32 will store this congestion information for eNodeB 12 in a manner that enables PCRF 32 to quickly access the congestion information using an identifier of eNodeB 12.

At block 46, IMS platform 30 may then receive a request to set up an IMS-based communication session (e.g., a VoIP call) with a UE in LTE network 10, such as UE 16. This request may take various forms. As one example, in line with the discussion above, the request may take the form of a SIP INVITE that identifies UE 16 as either the calling party or the called party. Other examples are possible as well.

After receiving this session-setup request, IMS platform 30 may also engage in further session-setup signaling with the calling and/or called parties. For instance, if the request is a SIP INVITE that identifies UE 16 as the calling party, IMS platform 30 may then exchange additional SIP signaling both with UE 16 (e.g., by sending a SIP 200 OK message and receiving a SIP ACK message) and with the called party (e.g., by sending a SIP INVITE message and receiving a SIP 183 SESSION PROGRESS message). Similarly, if the request is a SIP INVITE that identifies UE 16 as the called party, IMS platform 30 may then exchange additional SIP signaling with UE 16 (e.g., by sending a SIP INVITE message and receiving a SIP 183 SESSION PROGRESS message). Other examples are possible as well.

According to the present disclosure, in conjunction with this session-setup signaling, IMS platform 30 may also receive an identifier of the eNodeB currently serving UE 16 (e.g., a cell and/or sector identifier). Preferably, this eNodeB identifier will be included in at least one session-setup signaling message received by IMS platform 30. For example, if the session-setup signaling takes the form of SIP messaging, then a SIP INVITE (if UE 16 is the called party) or a SIP 183 SESSION PROGRESS message (if UE 16 is the called party) sent by UE 16 may be adapted to include an identifier of the eNodeB currently serving UE 16 (e.g., as part of the P-Access-Network-Info (P-ANI) header of such SIP messages). Other examples are possible as well. Further, IMS platform 30 could receive the identifier of the eNodeB currently serving UE 16 in other manners as well (e.g., by signaling with other entities in LTE network 10).

At block 48, IMS platform 30 may send to PCRF 32, and PCRF 32 may receive, a message indicating that a new bearer is needed for the communication session being set up with UE 16. In practice, this message may include at least an identifier of the eNodeB that is currently serving UE 16 (e.g., a cell and/or sector identifier) and an indication of the type of communication session being set up (e.g., a VoIP call, streaming video session, interactive gaming session, etc.), and it may also include a variety of other information about the requested communication session as well (e.g., codec, bandwidth, etc.). This message can take various forms, an example of which may be a Diameter message sent via an Rx interface between IMS platform 30 and PCRF 32.

At block 50, in response to receiving this message from IMS platform 30, PCRF 32 may then select a QoS level for the new bearer based at least in part on the level of congestion of the eNodeB currently serving UE 16. PCRF 32 may perform this selection in various manners.

According to one implementation, PCRF 32 may first identify a QoS level that corresponds to the type of communication session being set up (which may be indicated by the message received from IMS platform 30). For instance, in line with the discussion above, PCRF 32 may identify a QCI value that corresponds to the type of session being set up, examples of which may include QCI value of 1 for a VoIP call, a QCI value of 2 for live streaming video, a QCI value of 4 for real-time gaming, etc. However, PCRF 32 may identify a QoS level for the type of communication session being set up in other manners as well.

After identifying the QoS level that corresponds to the type of communication session being set up, the PCRF may then use the identifier of the eNodeB currently serving UE 16, which is eNodeB 12, to access congestion information for that eNodeB. As noted above, PCRF 32 should have previously received such congestion information for eNodeB 12 from MME 20, and in line with the discussion above, this congestion information will preferably indicate the eNodeB's level of congestion for each of various different QoS levels (e.g., different QCI values or ranges of QCI values). However, the congestion information may take other forms as well.

PCRF 32 may then use the congestion information for eNodeB 12 to determine whether eNodeB 12 is capable of establishing a new bearer having the identified QoS level. For instance, PCRF 32 may assess the eNodeB's level of congestion for the identified QoS level to determine whether eNodeB 12 has already established a threshold extent of bearers having the identified QoS level. However, PCRF 32 may determine whether eNodeB 12 is capable of establishing a new bearer having the identified QoS level in other manners as well.

Based on this determination, PCRF 32 may then (i) select the identified QoS level for the new bearer if eNodeB 12 is capable of establishing a new bearer having the identified QoS level (e.g., if eNodeB 12 has not yet reached its limit of bearers having the identified QoS level) and (ii) select a different QoS level for the new bearer if eNodeB 12 is not capable of establishing the new bearer having the identified QoS level (e.g., if eNodeB 12 has already reached its limit of bearers having the identified QoS level). In this respect, the act of selecting a different QoS level for the new bearer may take various forms. As one possible example, PCRF 32 may select the next-highest QoS level that eNodeB 12 is capable of using to establish the new bearer (e.g., if the identified QoS level is a QCI of 1, PCRF 32 may select a QCI of 2 if that QoS level is available for use to establish the new bearer).

The act of selecting the QoS level based at least in part on the level of congestion of the eNodeB currently serving UE 16 may take various other forms as well. For example, instead of first identifying a QoS level that corresponds to the type of communication session being set up, PCRF 32 could first identify the QoS levels that eNodeB 12 is currently capable of using to establish the new bearer, and PCRF 32 could then select the highest-identified QoS level that can support the requested session type. Various other implementations are also possible.

At block 52, after selecting the QoS level for the new bearer, PCRF 32 may invoke use of the selected QoS level for the new bearer. For example, in line with the discussion above, PCRF 32 may transmit to PGW 26 a directive to establish a new bearer having the selected QoS level, which may in turn cause PGW 26, SGW 22, MME 20, and eNodeB 12 to engage in bearer-setup signaling to establish the new bearer with the selected QoS level. The act of invoking use of the selected QoS level for the new bearer may take other forms as well.

Once the new bearer having the selected QoS level is established, UE 16 and PGW 26 may then exchange media content of the communication session (e.g., VoIP voice packets) via this new bearer in accordance with the selected QoS level.

Figure 3:
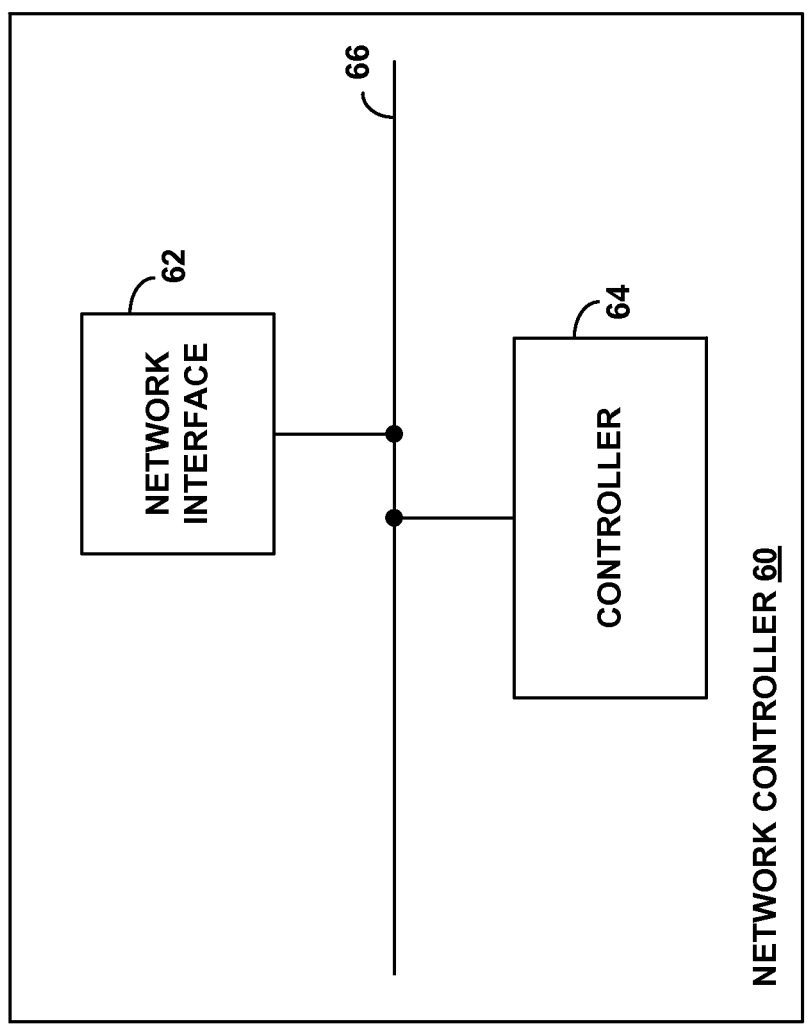
FIG. 3 is a simplified block diagram of an example network controller operable in accordance with the present disclosure.

FIG. 3 is next a simplified block diagram of an example network controller 60 (e.g., an MME or the like), showing some of the functional components that may be included in such an entity to facilitate carrying out features of the present disclosure. As shown in FIG. 3, network controller 60 includes a network communication interface 62 and a controller 64, with various ones of these or other components being communicatively linked together by a system bus, network, or other connection mechanism 66.

Network communication interface 62 functions to facilitate communication between network controller 60 and various other network entities, such as one or more base stations, a gateway (e.g., an SGW), and a policy server (e.g., a PCRF). As such, the interface may include one or more network interface modules, such as Ethernet network interface modules for instance or may take any of a variety of other forms, supporting wireless and/or wired communication with these and other components.

Controller 66 may then be configured to carry out the network-controller functions described above. For instance, the controller 66 may be configured to track a level of congestion for each of one or more base stations and to report congestion information for the one or more base stations to a policy server (e.g., a PCRF). Further, controller 66 may be configured to route signaling for setting up a communication session with a UE in the network (e.g., SIP signaling). Further yet, controller 66 may be configured to engage in signaling with other network entities (e.g., base stations, a SGW, etc.) to establish a bearer having a given QoS level that is selected by the policy server. Controller 66 may be configured to carry out various other functions as well.

In practice, controller 66 may take various forms, including various combinations of hardware, software, and/or firmware. For example, controller 66 may comprise one or more general-purpose and/or special-purpose processors and a non-transitory computer readable medium (e.g., volatile and/or non-volatile memory and/or other data storage elements) that stores executable instructions. The executable instructions, when executed by the one or more processors, may cause controller 66 (and thus network controller 60) to perform any of the network-controller functions described herein.

Figure 4:
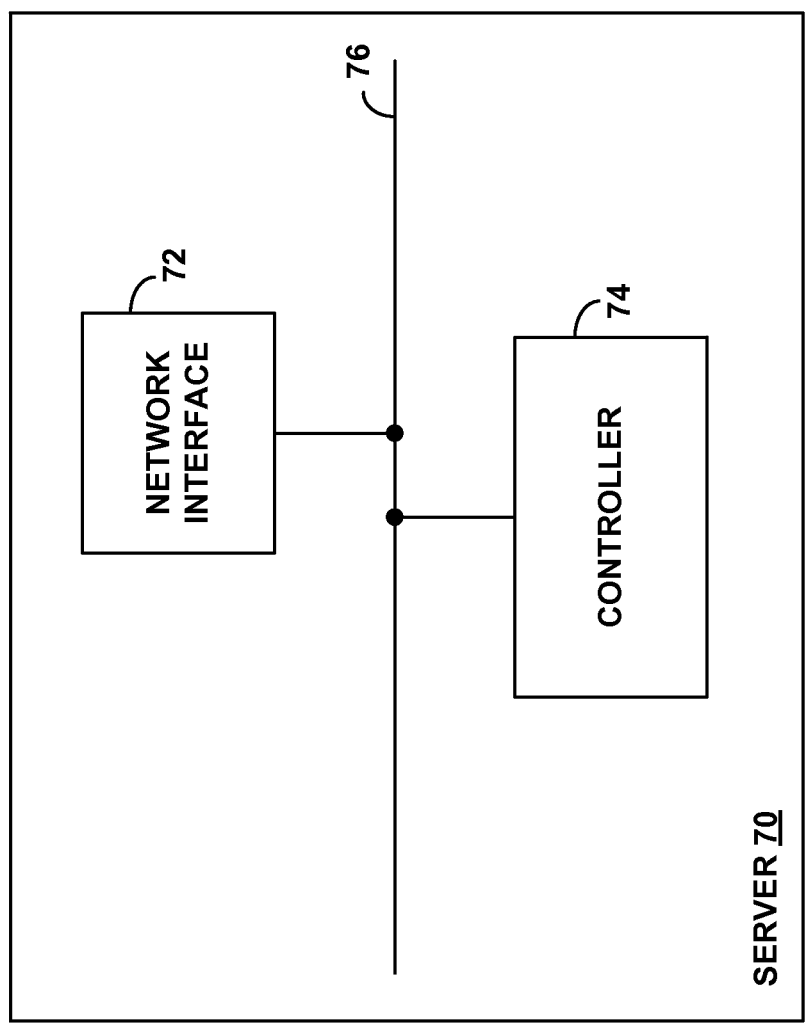
FIG. 4 is a simplified block diagram of an example server of a service platform operable in accordance with the present disclosure.

FIG. 4 is next a simplified block diagram of an example server 70 in a service platform (e.g., a CSCF of an IMS platform), showing some of the functional components that may be included in such an entity to facilitate carrying out features of the present disclosure. As shown in FIG. 4, server 70 includes a network communication interface 72 and a controller 74, with various ones of these or other components being communicatively linked together by a system bus, network, or other connection mechanism 76.

Network communication interface 72 functions to facilitate communication between server 70 and various other network entities, such as a gateway (e.g., a PGW) and a policy server (e.g., a PCRF). As such, the interface may include one or more network interface modules, such as Ethernet network interface modules for instance or may take any of a variety of other forms, supporting wireless and/or wired communication with these and other components.

Controller 74 may then be configured to carry out the service-platform functions described above. For instance, controller 74 may be configured to receive (e.g., from a gateway) a request to set up a communication session with a UE being served by a given base station in the network, where this request includes an identifier of the given base station. Further, controller 74 may be configured to send a directive to a policy server to select a QoS level for a new bearer to carry the communication session, where this directive includes an identifier of the given base station. Controller 74 may be configured to carry out various other functions as well.

In practice, controller 74 may take various forms, including various combinations of hardware, software, and/or firmware. For example, controller 74 may comprise one or more general-purpose and/or special-purpose processors and a non-transitory computer readable medium (e.g., volatile and/or non-volatile memory and/or other data storage elements) that stores executable instructions. The executable instructions, when executed by the one or more processors, may cause controller 74 (and thus server 70) to perform any of the service-platform functions described herein.

Figure 5:
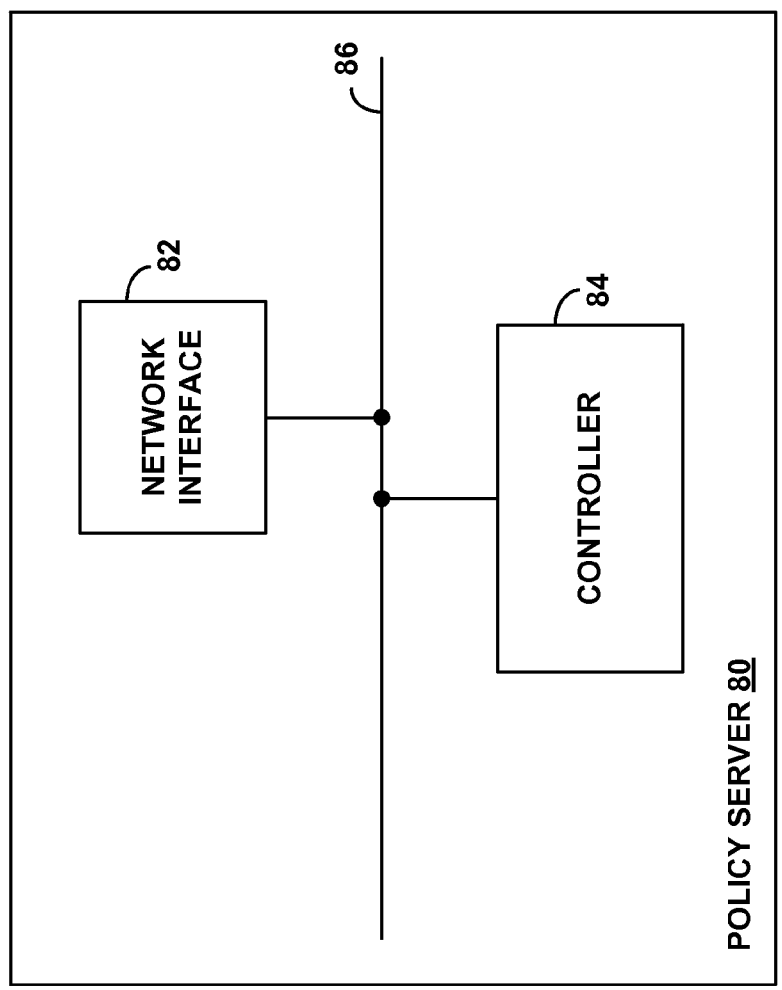
FIG. 5 is a simplified block diagram of an example policy server operable in accordance with the present disclosure.

FIG. 5 is next a simplified block diagram of an example policy server 80 (e.g., a PCFRF or the like), showing some of the functional components that may be included in such an entity to facilitate carrying out features of the present disclosure. As shown in FIG. 5, policy server 80 includes a network communication interface 82 and a controller 84, with various ones of these or other components being communicatively linked together by a system bus, network, or other connection mechanism 86.

Network communication interface 82 functions to facilitate communication between policy server 80 and various other network entities, such as a network controller (e.g., an MME), a gateway system (e.g., a PGW), and a service platform (e.g., an IMS platform). As such, the interface may include one or more network interface modules, such as Ethernet network interface modules for instance or may take any of a variety of other forms, supporting wireless and/or wired communication with these and other components.

Controller 84 may then be configured to carry out the policy-server functions described above. For instance, controller 84 may be configured to receive (e.g., from a network controller), store, and access congestion information for base stations in the network. Further, controller 84 may be configured to receive (e.g., from a service platform) a message indicating that a new bearer is needed for a communication session being set up with a UE being served by a given base station in the network. Further yet, controller 84 may be configured to select a QoS level for the new bearer based at least in part on the congestion information for the given base station. Still further, controller 84 may be configured to invoke use of the selected QoS level for the new bearer. Controller 84 may be configured to carry out various other functions as well.

In practice, controller 84 may take various forms, including various combinations of hardware, software, and/or firmware. For example, controller 84 may comprise one or more general-purpose and/or special-purpose processors and a non-transitory computer readable medium (e.g., volatile and/or non-volatile memory and/or other data storage elements) that stores executable instructions. The executable instructions, when executed by the one or more processors, may cause controller 84 (and thus policy server 80) to perform any of the policy-server functions described herein.

Exemplary embodiments have been described above. Those skilled in the art will understand, however, that changes and modifications may be made to these embodiments without departing from the true scope and spirit of the invention, which is defined by the claims.

We claim:

1. A method comprising:
   a policy charging and rules function (PCRF) receiving from an Internet Multimedia Subsystem (IMS) platform a message indicating that a new bearer is needed for an IMS-based session being set up for a user equipment device (UE), wherein the message received by the PCRF from the IMS platform includes a base station identifier of the base station that is serving the UE; and
   in response to the PCRF receiving from the IMS platform the message that indicates the new bearer is needed for the IMS-based session being set up with the UE and that includes the base station identifier of the base station that is serving the UE, (i) the PCRF using the base station identifier as a basis to determine a level of congestion of the base station serving the UE, (ii) the PCRF using the determined level of congestion of the base station serving the UE as a basis to select a quality of service (QoS) level to be used for the new bearer, and (iii) the PCRF invoking use of the selected QoS level for the new bearer,
   wherein the selected QoS level for the new bearer defines for the new bearer one or more QoS parameters including a parameter selected from the group consisting of priority level, maximum packet delay, maximum packet loss rate, and minimum bit rate.

2. The method of claim 1, further comprising:
   the PCRF receiving a report indicating the level of congestion of the base station, wherein the report is keyed to the identifier of the base station,
   wherein the PCRF using the base station identifier as a basis to determine the level of congestion of the base station serving the UE comprises the PCRF accessing the indicated level of congestion of the base station using the identifier of the base station.

3. The method of claim 2, wherein the report indicating the level of congestion of the base station comprises a report indicating a level of congestion of the base station for each of a plurality of QoS levels.

4. The method of claim 3, wherein the level of congestion of the base station for each of the plurality of QoS levels comprises, respectively for each QoS level of the plurality of QoS levels, an extent of bearers having the QoS level that are currently established by the base station.

5. The method of claim 1, wherein using the determined level of congestion of the base station serving the UE as a basis to select the QoS level to be used for the new bearer comprises:
   making a determination, based on the determined level of congestion of the base station, of whether the base station is capable of establishing a new bearer having a given QoS level; and
   based on the determination of whether the base station is capable of establishing a new bearer having the given QoS level, (i) selecting the given QoS level if the base station is capable of establishing a new bearer having the given QoS level and (ii) selecting a different QoS level if the base station is not capable of establishing a new bearer having the given QoS level.

6. The method of claim 5, wherein the given QoS level comprises a QoS level that corresponds with a type of the IMS-based session being set up.

7. The method of claim 5, wherein making the determination, based on the determined level of congestion of the base station, of whether the base station is capable of establishing a new bearer having the given QoS level comprises making a determination of whether the base station has established a threshold extent of bearers having the given QoS level.

8. The method of claim 5, wherein the different QoS level is a next-highest-QoS level that the base station is capable of using to establish the new bearer.

9. The method of claim 1, wherein the message further includes an indication of a type of the IMS-based session being set up, and wherein selecting the QoS level for the new bearer is further based on the indicated type of the IMS-based session being set up.

10. The method of claim 9, wherein selecting the QoS level to be used for the new bearer comprises:
identifying a QoS level that corresponds with the indicated type of the IMS-based session being set up;
making a determination, based on the determined level of congestion of the base station, of whether the base station is capable of establishing a new bearer having the identified QoS level; and
based on the determination of whether the base station is capable of establishing a new bearer having the identified QoS level, (i) selecting the identified QoS level if the base station is capable of establishing a new bearer having the identified QoS level and (ii) selecting a different QoS level if the base station is not capable of establishing a new bearer having the identified QoS level.

11. The method of claim 1, wherein the selected QoS level is represented by a QoS class indicator (QCI).

12. The method of claim 1, wherein the selected QoS level comprises a highest QoS level that the base station is currently capable of using to establish the new bearer.

13. The method of claim 1, wherein the IMS-based session is a voice over Internet Protocol (VoIP) session.

14. The method of claim 1, wherein the PCRF invoking use of the selected QoS level for the new bearer comprises the PCRF sending to one or more network entities a directive to establish the new bearer having the selected QoS level.

15. A policy charging and rules function server (PCRF) comprising:
a network interface configured to facilitate communication with one or more entities of an access network; and
a controller configured to control quality of service (QoS) level used for bearers, wherein the controller comprises a processing unit, data storage, and program instructions stored in the data storage and executable by the processing unit to carry out a plurality of functions, wherein the functions include receiving from an Internet Multimedia Subsystem (IMS) platform a message indicating that a new bearer is needed for an IMS-based session being set up with a user equipment device (UE), wherein the message received by the PCRF from the IMS platform includes a base station identifier of the base station that is serving the UE,
wherein the functions further comprise, in response receiving from the IMS platform the message that indicates the new bearer is needed for the IMS-based session being set up with the UE and that includes the base station identifier, (i) using the base station identifier as a basis to determine a level of congestion of the base station serving the UE, (ii) using the determined level of congestion of the base station serving the UE as a basis to select a QoS level to be used for the new bearer, and (iii) invoking use of the selected QoS level for the new bearer, and
wherein the selected QoS level for the new bearer defines for the new bearer one or more QoS parameters including a parameter selected from the group consisting of priority level, maximum packet delay, maximum packet loss rate, and minimum bit rate.

16. The PCRF of claim 15, wherein the functions further include receiving a report indicating the level of congestion of the base station, wherein the report is keyed to the identifier of the base station,
wherein using the base station identifier as a basis to determine the level of congestion of the base station serving the UE comprises accessing the indicated level of congestion of the base station using the identifier of the base station.

17. The PCRF of claim 15, wherein the message further includes an indication of a type of the IMS-based session being set up, and wherein selecting the QoS level for the new bearer is further based on the indicated type of the IMS-based session being set up.

18. The PCRF of claim 17, wherein selecting the QoS level to be used for the new bearer comprises:
identifying a QoS level that corresponds with the indicated type of the IMS-based session being set up;
making a determination, based on the determined level of congestion of the base station, of whether the base station is capable of establishing a new bearer having the identified QoS level; and
based on the determination of whether the base station is capable of establishing a new bearer having the identified QoS level, (i) selecting the identified QoS level if the base station is capable of establishing a new bearer having the identified QoS level and (ii) selecting a different QoS level if the base station is not capable of establishing a new bearer having the identified QoS level.

19. The PCRF of claim 15, wherein invoking use of the selected QoS level for the new bearer comprises sending to one or more network entities a directive to establish the new bearer having the selected QoS level.

20. The PCRF of claim 15, wherein the IMS-based session is a voice over Internet Protocol (VoIP) session.

* * * * *